(12) United States Patent
Miura

(10) Patent No.: US 10,795,212 B2
(45) Date of Patent: Oct. 6, 2020

(54) LIGHT-MODULATING CELL

(71) Applicant: DAI NIPPON PRINTING CO., LTD., Tokyo-to (JP)

(72) Inventor: Keisuke Miura, Tokyo-to (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 76 days.

(21) Appl. No.: 16/078,827

(22) PCT Filed: Feb. 21, 2017

(86) PCT No.: PCT/JP2017/006342
§ 371 (c)(1),
(2) Date: Aug. 22, 2018

(87) PCT Pub. No.: WO2017/146039
PCT Pub. Date: Aug. 31, 2017

(65) Prior Publication Data
US 2019/0056608 A1    Feb. 21, 2019

(30) Foreign Application Priority Data
Feb. 22, 2016 (JP) .................................. 2016-031078

(51) Int. Cl.
| G02F 1/1339 | (2006.01) |
| G02F 1/1335 | (2006.01) |
| G02F 1/1337 | (2006.01) |
| G02F 1/1341 | (2006.01) |

(Continued)

(52) U.S. Cl.
CPC .......... *G02F 1/1339* (2013.01); *G02F 1/1341* (2013.01); *G02F 1/13378* (2013.01); *G02F 1/133528* (2013.01); *G02B 5/30* (2013.01); *G02F 1/133723* (2013.01); *G02F 2001/13398* (2013.01); *G02F 2001/133354* (2013.01)

(58) Field of Classification Search
CPC .................................................... G02F 1/1339
See application file for complete search history.

(56) References Cited

U.S. PATENT DOCUMENTS

| 6,989,879 B1 * | 1/2006 | Nakahara | G02F 1/1337 349/123 |
| 2004/0036832 A1 * | 2/2004 | Momose | G02F 1/1339 349/153 |

(Continued)

FOREIGN PATENT DOCUMENTS

| JP | 2002-214626 A | 7/2002 |
| JP | 2008-281991 A | 11/2008 |

(Continued)

OTHER PUBLICATIONS

Aug. 2, 2019 Extended Search Report issued in European Application No. 17756477.0.

(Continued)

*Primary Examiner* — Sang V Nguyen
(74) *Attorney, Agent, or Firm* — Oliff PLC

(57) ABSTRACT

A stacked body includes a first resin film, a first electrode portion, a first alignment film, and a sealing material which are stacked, wherein the first alignment film has a permeation region where at least a part of components constituting the sealing material permeate.

22 Claims, 5 Drawing Sheets

(51) Int. Cl.
*G02B 5/30* (2006.01)
*G02F 1/1333* (2006.01)

(56) References Cited

U.S. PATENT DOCUMENTS

| | | | | |
|---|---|---|---|---|
| 2012/0044445 | A1* | 2/2012 | Monma | G02F 1/1345 |
| | | | | 349/123 |
| 2012/0135661 | A1* | 5/2012 | Imanishi | C08L 79/08 |
| | | | | 445/24 |
| 2014/0106503 | A1* | 4/2014 | Hirakata | H01L 23/3142 |
| | | | | 438/104 |
| 2015/0323837 | A1* | 11/2015 | Uesaka | G02F 1/133723 |
| | | | | 349/123 |
| 2015/0346556 | A1* | 12/2015 | Hirota | G02F 1/1339 |
| | | | | 349/43 |
| 2016/0244667 | A1* | 8/2016 | Ono | G02F 1/1339 |
| 2017/0102508 | A1* | 4/2017 | Yoda | G02B 6/4221 |
| 2017/0365825 | A1* | 12/2017 | Ijuin | H01G 11/78 |
| 2018/0329260 | A1* | 11/2018 | Mizusaki | G02F 1/1339 |

FOREIGN PATENT DOCUMENTS

| | | |
|---|---|---|
| JP | 2011-227258 A | 11/2011 |
| WO | 2015/071976 A1 | 5/2015 |

OTHER PUBLICATIONS

Dec. 9, 2016 Office Action issued in Japanese Patent Application No. 2016-211000.
May 16, 2017 International Search Report issued in International Patent Application No. PCT/JP2017/006342.
Aug. 3, 2020 Communication Under Rule 71(3) issued in European Patent Application No. 17 756 477.0.

* cited by examiner

LIGHT-MODULATING CELL

TECHNICAL FIELD

The present invention relates to a light-modulating cell capable of changing light transmittance using liquid crystal, and more particularly to a light-modulating cell in which a sealing material is formed on an alignment film.

BACKGROUND ART

A light-modulating cell, capable of changing a light transmittance by changing an electric field to be applied to a liquid crystal layer sandwiched between alignment films, has been known. In such a light-modulating cell, the liquid crystal layer is surrounded by a sealing material between the alignment films so that outflow of liquid crystal from the space between the alignment films and inflow of outside air into the liquid crystal layer are prevented.

In general, such a sealing material for sealing the liquid crystal layer is applied to "a base material, an electrode layer, and an alignment film" which have been integrally formed.

For example, Patent Literature 1 discloses a sealing material for a liquid crystal display device. In this liquid crystal display device, an array substrate and a counter substrate are bonded to each other by a sealing material, and a liquid crystal layer is sealed in the space formed by the array substrate, the counter substrate, and the sealing material. Specifically, the sealing material is applied on the array substrate configured by forming various electrodes and an alignment film on a glass substrate, a liquid crystal composition is dropped on the array substrate, and the counter substrate configured by forming a counter electrode and an alignment film on a glass substrate is superimposed on the sealing material.

CITATION LIST

Patent Literature

Patent Literature 1: Japanese patent application publication No. 2002-214626

SUMMARY OF INVENTION

Technical Problem

Since the sealing material is a member configured to seal the liquid crystal layer between the alignment films, it is necessary to provide the sealing material on the alignment film so as to have the same height as or a greater height than the liquid crystal layer. However, a degree of adhesion of the sealing material to the alignment film is not necessarily strong. For example, an adhesive force between polyimide widely used as an alignment film and a commercially-available sealing material is weak, and it is practically difficult to secure the position fixing performance of the sealing material and the adhesion performance between the alignment films only by the adhesive force between the polyimide and the commercially-available sealing material when assuming a light-modulating cell used for a window portion of a vehicle (automobile) or the like.

On the other hand, an adhesive force between indium-tin oxide (ITO) widely used as an electrode and a commercially-available sealing material is strong in many cases. Thus, the sealing material is usually arranged not only on the alignment film but also on the electrode. In this case, it is possible to appropriately seal the liquid crystal layer on the alignment film by the sealing material on the alignment film while securing the strong position fixing performance of the sealing material and the adhesion performance between the electrodes by the adhesive force between the electrode and the sealing material. However, it is necessary to arrange the sealing material even on the electrode in this technique, and thus, the sealing material can be provided only at a portion where the electrode is exposed in the vicinity and it is difficult to provide the sealing material at a portion where the electrode is not exposed in the vicinity. Thus, it is difficult to form a sealing material on an alignment film using, for example, a roll-to-roll method in which it is necessary to arrange the sealing material even at a portion of the alignment film where an electrode is not exposed in the vicinity thereof.

In addition, when a resin (resin film) is used instead of glass as a base material supporting an electrode, the resin base material is heated and a gas (degassing) is generated in some cases. Such a gas generated from the resin substrate enters a space between the sealing material and the alignment film to weaken the adhesion and the adhesive force between the sealing material and the alignment film in some cases. Thus, when the resin is used as a base material supporting an alignment film, it is particularly difficult to secure the adhesive strength of the sealing material to the alignment film with high reliability for a long period of time.

The present invention has been made in view of the above circumstances, and an object thereof is to provide a light-modulating cell in which a sealing material is firmly attached to an alignment film while resin is used for a base material supporting an electrode portion.

Solution to Problem

One aspect of the present invention is directed to stacked body comprising a first resin film, a first electrode portion, a first alignment film, and a sealing material which are stacked, wherein the first alignment film has a permeation region where at least a part of components constituting the sealing material permeate.

Another aspect of the present invention is directed to a stacked body comprising a first resin film, a first electrode portion, a first alignment film, and a sealing material which are stacked, wherein: the first alignment film has a permeation region where at least a part of components constituting the sealing material permeate and a non-permeation region where no components constituting the sealing material permeate, and a portion of the sealing material that does not permeate the first alignment film, the permeation region of the first alignment film, and the non-permeation region of the first alignment film are sequentially arranged in a stacking direction.

The permeation region may occupy a range of 30% or more of the first alignment film with respect to a stacking direction of the first alignment film and the sealing material.

At least a part of the components constituting the sealing material which permeate the first alignment film may permeate up to a portion separated from an end surface of the first alignment film on a side of the sealing material by 30 nanometers or more with respect to a stacking direction of the first alignment film and the sealing material.

The sealing material may contain a thermosetting component, and the components constituting the sealing material that permeate the first alignment film may contain the thermosetting component.

The thermosetting component may be an epoxy resin.

The first alignment film may contain an organic compound.

The organic compound may be polyimide.

The sealing material may contain a photocurable component.

Another aspect of the present invention is directed to a light-modulating cell comprising: any of the above-described stacked bodies; and a second alignment film, a second electrode portion, and a second resin film which are stacked on the sealing material of the stacked body.

Another aspect of the present invention is directed to a light-modulating cell comprising: a pair of polarizing elements; a pair of electrode base material layers arranged between the pair of polarizing elements, each of the electrode base material layers having a resin film and an electrode portion fixed to the resin film; a pair of alignment films arranged between the pair of electrode base material layers; a liquid crystal layer arranged between the pair of alignment films; and a sealing material arranged between the pair of alignment films to be adjacent to the liquid crystal layer, wherein at least a part of components constituting the sealing material permeates up to a portion separated from an end surface of at least any one of the pair of alignment films on a side of the sealing material by 30 nanometers or more with respect to a stacking direction of the pair of alignment films and the sealing material.

The sealing material may contain a thermosetting component, and the components constituting the sealing material that permeate at least one of the pair of alignment films may contain a thermosetting component.

The thermosetting component may be an epoxy resin.

The pair of alignment films may contain an organic compound.

The organic compound may be polyimide.

The sealing material may contain a photocurable component.

Advantageous Effects of Invention

According to the present invention, at least a part of the components constituting the sealing material sufficiently permeate the alignment layer, and thus, it is possible to firmly attach the sealing material to the alignment film even when the resin film is used as the substrate supporting the electrode portion.

DESCRIPTION OF EMBODIMENTS

Hereinafter, an embodiment of the present invention will be described with reference to the drawings. Incidentally, the drawings attached to the specification of the present application include parts where a scale, a dimensional ratio, and the like of each element are conveniently exaggerated and changed from the actual scale, dimensional ratio, and the like in order to facilitate the illustration and understanding. In addition, for example, various terms are not necessarily distinguished from each other based solely on differences in nomenclature in the present specification. For example, a term "film" can generically refer to members called a sheet, a film, a membrane, and a layer. In addition, the terms specifying shapes, geometric conditions, and extent thereof used in this specification are understood as terms meaning ranges of extent where substantially the equivalent or similar functions can be expected without being bound by strict meaning.

Figure 1:
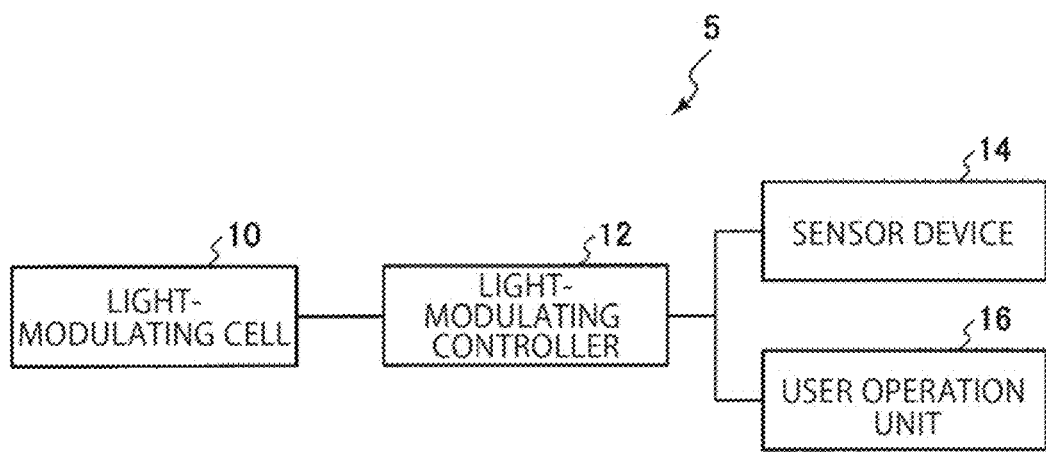
FIG. 1 is a conceptual diagram illustrating an example of a light-modulating system.

FIG. 1 is a conceptual diagram illustrating an example of a light-modulating system 5.

A light-modulating cell 10 of this example has a liquid crystal layer made of a liquid crystal material containing liquid crystal molecules as will be described later, and can switch shielding and transmission of light and continuously change the transmittance (transmissivity) of light. An object to which the light-modulating cell 10 is applied is not particularly limited, and typically, the light-modulating cell 10 can be applied to a window, a door, and the like, and can be applicable with respect to, for example, buildings and vehicles (cars and the like).

The light-modulating cell 10 is connected to a light-modulating controller 12 via flexible printed circuits (FPC)

or the like, and a sensor device 14 and a user operation unit 16 are connected to the light-modulating controller 12. The light-modulating controller 12 controls a light-modulating state of the light-modulating cell 10 and can switch the shielding and transmission of light using the light-modulating cell 10 and change the light transmittance in the light-modulating cell 10. Specifically, the light-modulating controller 12 adjusts an electric field to be applied to a liquid crystal layer of the light-modulating cell 10 to change alignment of the liquid crystal molecules in the liquid crystal layer in such a manner that the shielding and transmission of light can be switched and the light transmittance can be changed using the light-modulating cell 10.

The light-modulating controller 12 can adjust the electric field to be applied to the liquid crystal layer based on an arbitrary method. For example, the light-modulating controller 12 can switch the shielding and transmission of light and change the light transmittance using the light-modulating cell 10 by adjusting the electric field to be applied to the liquid crystal layer in accordance with a measurement result of the sensor device 14 or an instruction (command) input by a user via the user operation unit 16. Therefore, the light-modulating controller 12 may automatically adjust the electric field to be applied to the liquid crystal layer in accordance with the measurement result of the sensor device 14 or may manually adjust the electric field in accordance with the instruction of the user input via the user operation unit 16. Incidentally, an object to be measured by the sensor device 14 is not particularly limited, and, for example, the brightness of use environment may be measured, and in this case, the switching of the shielding and transmission of light and the change of the light transmittance using the light-modulating cell 10 are performed in accordance with the brightness of use environment. In addition, it is not always necessary for both the sensor device 14 and the user operation unit 16 to be connected to the light-modulating controller 12, and only any one of the sensor device 14 and the user operation unit 16 may be connected to the light-modulating controller 12.

Figure 2:
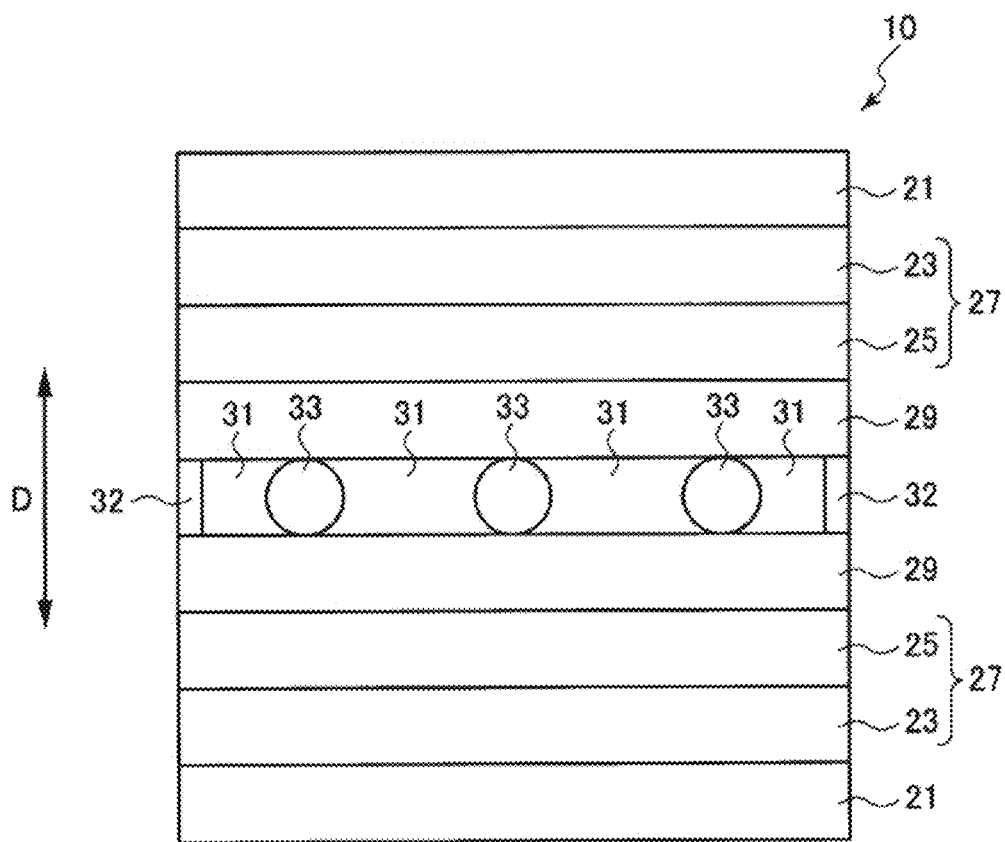
FIG. 2 is a view illustrating an example of a cross section of a light-modulating cell.

FIG. 2 is a view illustrating an example of a cross section of the light-modulating cell 10.

The light-modulating cell 10 of this example includes: a pair of polarizing elements 21; a pair of electrode base material layers 27 arranged between the pair of polarizing elements 21; a pair of alignment films 29 arranged between the pair of electrode base material layers 27; a liquid crystal layer 31 arranged between the pair of alignment films 29; and a sealing material 32 arranged to be adjacent to the liquid crystal layer 31 between the pair of alignment films 29.

Each of the pair of electrode base material layers 27 has a resin film 23 and an electrode portion 25 fixed to the resin film 23. The polarizing element 21 is attached to the resin film 23, and the alignment film 29 is superimposed on the electrode portion 25 to be stacked in layers.

Many spacers 33, which serve a role of holding a spacing (cell gap) between the alignment films 29 in such a manner that the liquid crystal layer 31 as a whole has a uniform thickness, are arranged between the pair of alignment films 29. Although the bead-shaped (spherical) spacers 33 are used in the illustrated example, the shape of the spacers 33 is not particularly limited, and the columnar (for example, truncated conical) spacers 33 may be used. In addition, the spacers 33 are each present only between the pair of alignment films 29 in the illustrated example, but positions where the respective spacers 33 are present are not particularly limited, and, for example, each of the spacers 33 may extend in a stacking direction D so as to penetrate through not only the liquid crystal layer 31 but also one of the alignment films 29.

Each of the pair of polarizing elements 21 is configured as a so-called polarizing plate (polarizing filter), and transmits only light having a specific polarization direction. That is, each of the polarizing elements 21 has a unique polarization axis and a unique absorption axis, and allows only light polarized in a specific direction to pass therethrough. The arrangement form between the pair of polarizing elements 21 is not particularly limited, and the arrangement form between the pair of polarizing elements 21 is determined in relation with an alignment state of the liquid crystal molecules contained in the liquid crystal layer 31. Representative examples thereof include a state called "cross nicol" where the pair of polarizing elements 21 are arranged so as to have the polarization axes orthogonal to each other and a state called "parallel nicol" where the pair of polarizing elements 21 are arranged so as to have the polarization axes parallel to each other.

Each of the pair of resin films 23 uses a resin at least a part thereof, and exhibits a highly flexible property. Therefore, it is easy to "bond the light-modulating cell 10 to a curved surface" according to the light-modulating cell 10 of the present embodiment, which is difficult in the case of using a glass substrate. In this manner, at least one of the pair of resin films 23 may be partially or entirely curved (bent).

The pair of electrode portions 25 applies a desired electric field to the liquid crystal layer 31 as a voltage is applied thereto by the light-modulating controller 12 (see FIG. 1). Members constituting each of the electrode portions 25 and an arrangement form of each of the electrode portions 25 are not particularly limited. For example, each of the electrode portions 25 can be formed using a member excellent in visible light transmissivity and conductivity such as indium tin oxide (ITO).

The space between the pair of alignment films 29 is filled with a liquid crystal member forming the liquid crystal layer 31 together with a plurality of spacers 33. The pair of alignment films 29 are members configured to align the liquid crystal molecules contained in the liquid crystal layer 31 in a desired direction. An alignment method of the liquid crystal layer 31 using the pair of alignment films 29 is not particularly limited, and for example, a twisted nematic (TN) method, a vertical alignment (VA) method, or an in-place-switching (IPS) method can be adopted. Members constituting each of the alignment films 29 are also not particularly limited, and for example, polyimide of an organic compound can be suitably used as a material of the alignment films.

Incidentally, elements other than the above-described elements may be arranged at arbitrary positions in the light-modulating cell 10 having the above-described stacked structure, and the light-modulating cell 10 may include various members configured to impart arbitrary functions. For example, when it is desired to improve the rigidity of the light-modulating cell 10, a transparent layer having excellent rigidity may be provided. In addition, when it is desired to improve the adhesion between layers, a transparent layer having excellent adhesion may be arranged between desired layers. In addition, when it is desired to prevent a scratch and the like, a hard coat layer having excellent scratch resistance may be arranged at the outermost layer or at a position close to the outermost layer. Specific constituent components and forming method of the hard coat layer are not limited, and for example, it is also possible to use a cured coating film containing fine particles of titanium dioxide obtained by using an ultraviolet curable resin as the hard coat layer. In addition, the light-modulating cell 10 may include a member having diffusion performance and a member for adjusting a traveling direction of light, and may include a member having other optical functions. Therefore, for example, each of the resin films 23 may have a single layer structure or a multilayer structure, and in the case of the multilayer structure, a plurality of layers having mutually different functions may be stacked.

Further, the sealing material 32 is arranged at the outer side of the liquid crystal layer 31 between the pair of alignment films 29, and the liquid crystal layer 31 is sealed in the space surrounded by the sealing material 32. In this manner, the sealing material 32 holds the liquid crystal layer 31 in the state of being shielded from outside air between the pair of alignment films 29. In addition, the sealing material 32 of the present embodiment is fixed (attached) to each of the alignment films 29 in a good condition and is hardly peeled off from each of the alignment films 29 even when an external force is applied. The sealing material 32 of the present embodiment exhibiting these characteristics contains a plurality of components, and contains, as a curable component, at least one of a thermosetting component (for example, a thermosetting resin) and a photocurable component (for example, a photocurable resin).

As described below, the sealing material 32 of the present embodiment contains the thermosetting resin and the ultraviolet curable resin, and is strongly attached to each of the alignment films 29 at a desired position through curing (provisional fixing) by ultraviolet irradiation and curing (final fixing) by heating.

In addition, at least a part of the components constituting the sealing material 32 permeate up to a portion separated from an end surface of at least any one of the pair of alignment films 29 on the sealing material 32 side by 30 nanometers (nm) or more with respect to the stacking direction D of the alignment films 29 and the sealing material 32. In the present embodiment, the thermosetting resin contained in the sealing material 32 permeates up to the portion separated from the end surface on the sealing material 32 side in each of the pair of alignment films 29 by 30 nm or more with respect to the stacking direction D.

Figure 3:
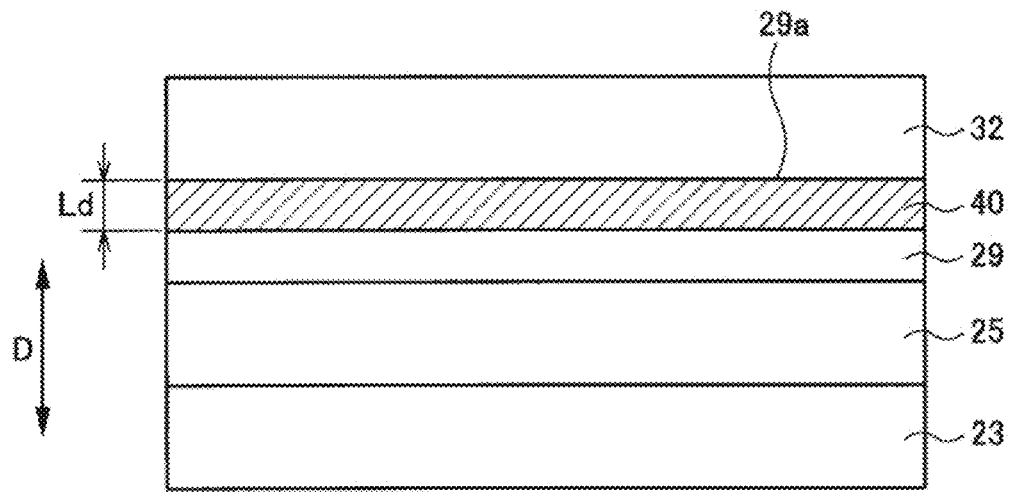
FIG. 3 is an enlarged cross-sectional view conceptually illustrating a stacked structure of a sealing material, an alignment film, an electrode portion, and a resin film.

FIG. 3 is an enlarged cross-sectional view conceptually illustrating a stacked structure of the sealing material 32, the alignment film 29, the electrode portion 25, and the resin film 23. In the light-modulating cell 10 of the present embodiment, as illustrated in FIG. 3, the thermosetting resin (for example, the epoxy resin) contained in the sealing material 32 permeates the portion of the alignment film 29 (hereinafter, also referred to as a "permeation region 40") "from an end surface 29a on the sealing material 32 side up to a portion at a position separated from the end surface 29a by a distance Ld with respect to the stacking direction D". As a result, the sealing material 32 directly adheres to the permeation region 40 of the alignment film 29, and the degree of adhesion is also extremely strong. Incidentally, FIG. 3 illustrates only the stacked structure (the sealing material 32, the alignment film 29, the electrode portion 25, and the resin film 23) arranged on one side of the sealing material 32 in the stacking direction D, but a stacked structure on the other side may be similar.

As a result of intensive research, the inventor of the present application has obtained new findings that the degree of fixation of the sealing material 32 with respect to the alignment film is practically sufficient if the distance Ld is about 30 nm or more although the degree of fixation of the sealing material 32 with respect to the alignment film is practically insufficient if the distance Ld of the permeation region 40 in the stacking direction D is about a few nm.

In principle, the component permeating the alignment film 29 may be any curable component contained in the sealing material 32 (any one or both of the ultraviolet curable resin and the thermosetting resin in the present embodiment). The inventor of the present application has obtained new findings that it is possible to suitably form the desired permeation region 40 by causing the thermosetting resin to permeate the alignment film 29 by utilizing the fluidity of the thermosetting resin at an initial heating stage. Incidentally, the degree of permeation of the curable component into the alignment film 29 varies depending on a combination of constituent materials of the sealing material 32 containing the curable component and the alignment film 29, and a curable resin having a lower molecular weight permeates the alignment film 29 more easily.

Figure 4:
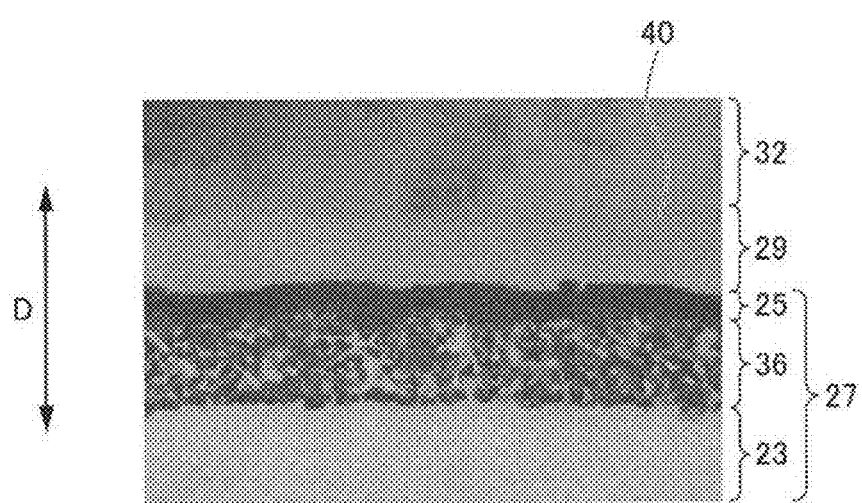
FIG. 4 is an SEM image of a cross section of an actually-manufactured light-modulating cell in the vicinity of a sealing material and illustrates the light-modulating cell in which the sealing material is solidified in a state where almost no sealing material has permeated an alignment film.
Figure 5:
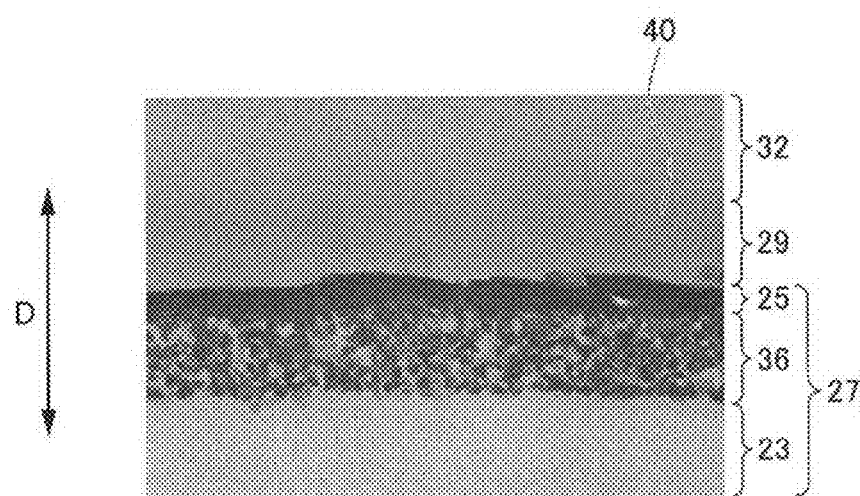
FIG. 5 is an SEM image of a cross section of an actually-manufactured light-modulating cell in the vicinity of a sealing material and illustrates the light-modulating cell in which the sealing material is solidified in a state where the sealing material has sufficiently permeated the alignment film.
Figure 6:
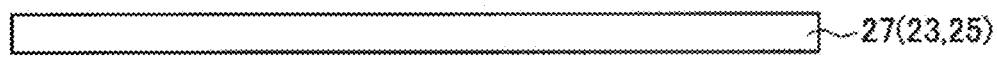
FIG. 6 is a schematic view for describing an example of a method for manufacturing a light-modulating cell, and illustrates a cross section of each element constituting the light-modulating cell.

FIGS. 4 and 5 are scanning electron microscope (SEM) images of a cross section of actually-manufactured light-modulating cells 10 in the vicinity of the sealing material 32, FIG. 4 illustrates a light-modulating cell 10 in which the sealing material 32 is solidified in a state where almost no sealing material 32 has permeated the alignment film 29, and FIG. 5 illustrates a light-modulating cell 10 in which the sealing material 32 is solidified in a state where the sealing material 32 has sufficiently permeated the alignment film 29.

The light-modulating cell 10 of FIG. 4 and the light-modulating cell 10 of FIG. 5 have the common elements other than the constituent components of the sealing material 32, and the molecular weight of the epoxy resin (thermosetting resin) contained in the sealing material 32 of the light-modulating cell 10 of FIG. 4 is set to be larger than the molecular weight of the epoxy resin contained in the sealing material 32 of the light-modulating cell 10 of FIG. 5.

In each of the light-modulating cells 10 illustrated in FIGS. 4 and 5, the sealing material 32, the alignment film 29, the electrode portion 25, and the resin film 23 are sequentially stacked and superimposed on each other, and a hard coat layer 36 is interposed between the electrode portion 25 and the resin film 23. In addition, each of the alignment films 29 was made of polyimide and imparted with an alignment characteristic by an optical alignment method. The electrode portion 25 was made of ITO, and the resin film 23 was made of a cyclo olefin polymer (COP).

In FIGS. 4 and 5, in the alignment film 29, the permeation region 40 of the constituent component (mainly the epoxy resin in this example) of the sealing material 32 is represented by black shadows. As apparent from FIGS. 4 and 5, a slight shadow is observed in the vicinity of the boundary between the sealing material 32 and the alignment film 29 in the light-modulating cell 10 of FIG. 4. On the other hand, a shadow reaching a depth of about half of the entire alignment film 29 in the stacking direction D is observed in the vicinity of the boundary between the sealing material 32 and the alignment film 29 in the light-modulating cell 10 of FIG. 5. Incidentally, a shaded portion of the SEM images does not necessarily indicate only the epoxy resin, but other elements may be reflected as shaded portions on the SEM image depending on component states of the sealing material 32 and the alignment film 29. When actually examining the degree of permeation of the epoxy resin in the alignment film 29 of each of the light-modulating cells 10 of FIGS. 4 and 5, in the light-modulating cell 10 of FIG. 4, almost no epoxy resin component substantially permeated the alignment film 29 and the epoxy resin was merely present on the end surface of the alignment film 29 (that is, a boundary surface between the sealing material 32 and the alignment film 29). On the other hand, in the light-modulating cell 10 of FIG. 5, an epoxy resin component permeated the alignment film 29 and the epoxy resin was present over a range of 50 nm or more from the end surface of the alignment film 29 (for example, a boundary surface between the sealing material 32 and the alignment film 29).

Further, the inventor of the present application has conducted a peeling test of the light-modulating cells 10 illustrated in FIGS. 4 and 5, respectively, to evaluate the degree of adhesion between the sealing material 32 and the alignment film 29. More specifically, the sealing material 32 and the alignment film 29 were pulled in opposite directions with respect to the direction (stacking direction D) substantially perpendicular to an adhesion surface between the sealing material 32 and the alignment film 29 to peel off the sealing material 32 and the alignment film 29 from each other. In addition, the degree of adhesion between the sealing material 32 and the alignment film 29 was evaluated by measuring a force required for such peeling-off. Incidentally, for example, it is possible to refer to a T-peel test prescribed in international organization for standardization (ISO) 11339 regarding a method of the evaluation. According to the evaluation, the sealing material 32 and the alignment film 29 were easily peeled off with a relatively weak force (approximately 0.5 N/cm width (that is, 0.5 N (Newton) per 1 cm width)) in the light-modulating cell 10 of FIG. 4, but the sealing material 32 and the alignment film 29 are actually not peeled off in the light-modulating cell 10 of FIG. 5, and material destruction of the sealing material 32 and the alignment film 29 was caused before the sealing material 32 was peeled off from the alignment film 29.

Therefore, even from the above-described evaluation result, it is understood that it is possible to strongly attach the sealing material 32 to the alignment film 29 by causing at least a part of the components constituting the sealing material 32 (the thermosetting resin (epoxy resin) in the above evaluation example) to permeate up to the portion separated from the end surface of the sealing material 32 side by 50 nm or more with respect to the stacking direction in the alignment film (polyimide in the above evaluation example) 29.

<Example of Method for Manufacturing Light-Modulating Cell 10>

FIGS. 6 to 12 are schematic views for describing an example of a method for manufacturing the light-modulating cell 10, and illustrate a cross section of each element constituting the light-modulating cell 10.

Figure 7:
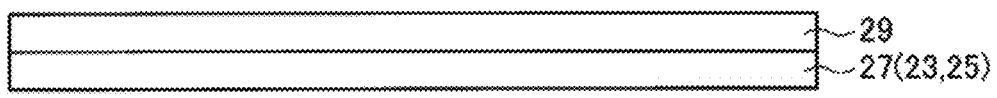
FIG. 7 is a schematic view for describing an example of the method for manufacturing the light-modulating cell, and illustrates a cross section of each of elements constituting the light-modulating cell.

First, the electrode base material layer 27 in which the electrode portion 25 is formed on one surface side of the resin film 23 is prepared (see FIG. 6), and the alignment film 29 is formed on the electrode base material layer 27 (particularly the electrode portion 25) (see FIG. 7). The alignment film 29 is arranged on the electrode base material layer 27 by an arbitrary method such as roller coating, and desired alignment characteristics are imparted to the alignment film 29 by a rubbing method or an optical alignment method.

Figure 8:
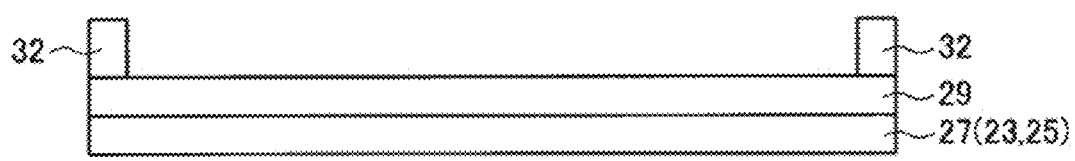
FIG. 8 is a schematic view for describing an example of the method for manufacturing the light-modulating cell, and illustrates a cross section of each of elements constituting the light-modulating cell.

Further, the sealing material 32 is formed directly on the alignment film 29 (see FIG. 8). A method of forming the sealing material 32 is not particularly limited. The sealing material 32 can be arranged typically in a bank shape by discharging the sealing material 32 from a dispenser toward a desired region on the alignment film 29, but other methods may be used, and for example, a screen printing method may be used to form the sealing material 32 on the alignment film 29. Incidentally, it is preferable that the sealing material 32 at this stage have a greater height (length) in the stacking direction D than the spacer 33 and the liquid crystal layer 31 from the viewpoint of securing the good adhesion between the sealing material 32 and the alignment film 29.

Figure 9:
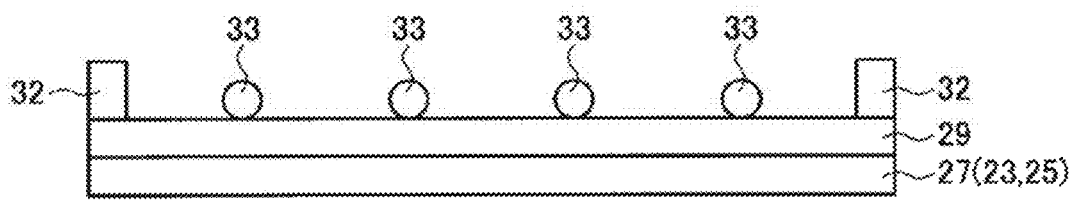
FIG. 9 is a schematic view for describing an example of the method for manufacturing the light-modulating cell, and illustrates a cross section of each of elements constituting the light-modulating cell.

Further, a plurality of bead-shaped spacers 33 are dispersed in the space surrounded by the sealing material 32 on the alignment film 29 (see FIG. 9). Incidentally, the positions of the respective spacers 33 may be fixed by performing heat welding or the like of each of the spacers 33 with respect to the alignment film 29 at this stage. In addition, when columnar spacers are used instead of the bead-shaped spacers, the columnar spacers may be provided on the electrode base material layer 27 (particularly the electrode portion 25) and a step of forming the alignment film 29 on the electrode base material layer 27 (see FIG. 7) or the like may be performed thereafter.

Figure 10:
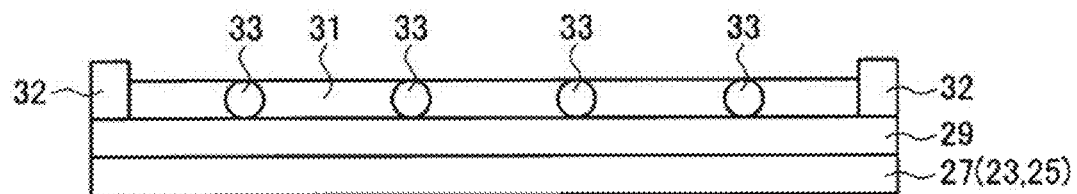
FIG. 10 is a schematic view for describing an example of the method for manufacturing the light-modulating cell, and illustrates a cross section of each of elements constituting the light-modulating cell.

Further, the liquid crystal is arranged in the space surrounded by the sealing material 32 on the alignment film 29 to form the liquid crystal layer 31 (see FIG. 10). A method of applying the liquid crystal onto the alignment film 29 is not particularly limited, and the liquid crystal layer 31 can be formed according to a so-called one drop fill (ODF) method.

Before or after the liquid crystal is arranged on the alignment film 29, the sealing material 32 is provisionally fixed to the alignment film 29 in such a manner that the position of the sealing material 32 on the alignment film 29 is set. Specifically, the sealing material 32 is irradiated with ultraviolet (UV) light, and the ultraviolet curable resin contained in the sealing material 32 is cured, so that the sealing material 32 can be provisionally fixed. Incidentally, it is sufficient that the provisional fixing of the sealing material 32 is fixed (cured) to such an extent that the sealing material 32 does not move even if receiving a force from the liquid crystal, and the timing of such provisional fixing is preferably before the liquid crystal comes into contact with the sealing material 32, but is not particularly limited as long as the timing is before the liquid crystal comes into contact with the sealing material 32.

Figure 11:
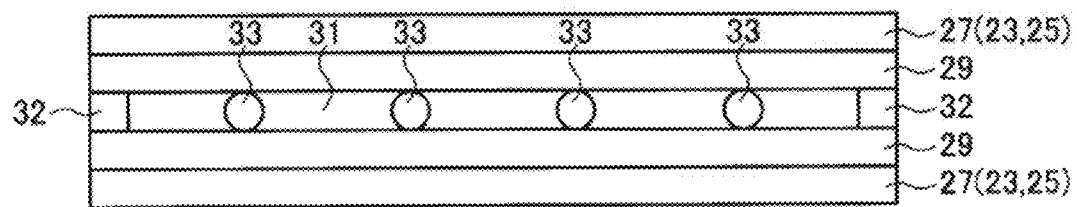
FIG. 11 is a schematic view for describing an example of a method for manufacturing the light-modulating cell, and illustrates a cross section of each of elements constituting the light-modulating cell.

Then, a stacked body of the alignment film 29 and the electrode base material layer 27 (the resin film 23 and the electrode portion 25) prepared separately is arranged so as to cover the liquid crystal layer 31 (see FIG. 11). In this case, the liquid crystal layer 31, the sealing material 32, and the spacers 33 are arranged so as to be adjacent to each of the alignment films 29. In addition, the sealing material 32 is compressed in the stacking direction D so as to closely adhere to each of the alignment films 29 without any gap, and the liquid crystal layer 31, the sealing material 32, and the spacers 33 have substantially the same height in the stacking direction D with respect to each other. Further, the adhesion (final fixing) of the sealing material 32 with respect to each of the alignment films 29 is performed at this stage. Specifically, the sealing material 32 is heated, so that a curing process of the thermosetting resin contained in the sealing material 32 is performed. As described above, the thermosetting resin (epoxy resin) of the sealing material 32 permeates the alignment films 29 (polyimide) to form the "permeation region 40 having the length (depth) of 30 nm or more with respect to the stacking direction D" in the present embodiment. A specific heating method such as a heating temperature and a heating time of the sealing material 32 is preferably adjusted as appropriate so as to promote permeation of the thermosetting resin into the alignment film 29 to form the desired permeation region 40.

Figure 12:
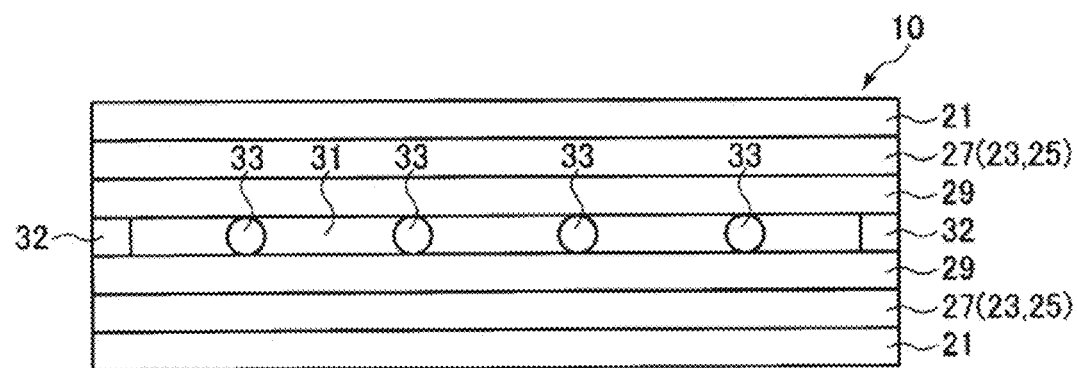
FIG. 12 is a schematic view for describing an example of the method for manufacturing the light-modulating cell, and illustrates a cross section of each of elements constituting the light-modulating cell.

Then, the polarizing elements 21 are bonded to the outer side of the respective electrode base material layers 27 (that is, on the resin films 23) (see FIG. 12). The light-modulating cell 10 can be formed through the above-described series of steps (see FIGS. 6 to 12).

As described above, according to the light-modulating cell 10 of the present embodiment, it is possible to directly attach the sealing material 32 to an alignment film 29 with a strong force by causing at least a part of the components of the sealing material 32 (the thermosetting resin (epoxy resin) in the above embodiment) to permeate the alignment film 29 at the depth of 30 nm or more. Therefore, even if a gas is generated from the resin film 23, such a gas hardly intrudes between the alignment film 29 and the sealing material 32, and the strong adhesion of the sealing material 32 with respect to the alignment films 29 is maintained even if the gas intrudes between the sealing material 32 and the alignment films 29. In addition, it is also possible to appropriately form the sealing material 32 at a desired position on the integrally stacked body of "the alignment film 29 and the electrode base material layer 27 (the resin film 23 and the electrode portion 25)" using a roll-to-roll method, which is conventionally difficult.

Figure 13:
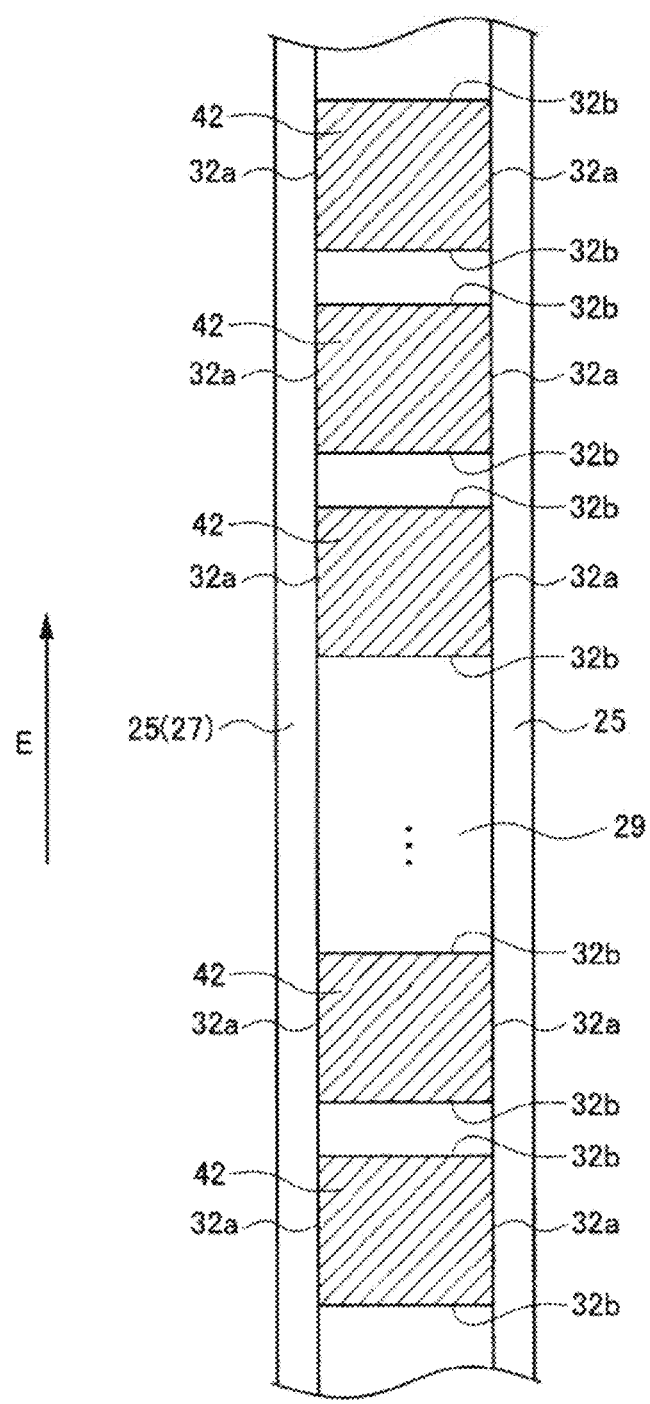
FIG. 13 is a view for describing a method for forming a sealing material on an alignment film by a roll-to-roll method, and is a plan view of the stacked body of an electrode portion (electrode base material layer) and an alignment film which are integrally formed.

FIG. 13 is a view for describing a method for forming a sealing material 32 on an alignment film 29 by a roll-to-roll method, and is a plan view of the stacked body of an electrode portion 25 (the electrode base material layer 27) and the alignment film 29 which are integrally formed. In the example illustrated in FIG. 13, the web-shaped stacked body of the electrode base material layer 27 and the alignment film 29 extends to be elongated in a direction indicated by an arrow "E", the electrode portions 25 are exposed on both sides of the alignment film 29. A region (hereinafter also referred to as a "liquid crystal layer formation region 42") indicated by a hatched portion in FIG. 13 is a region configured to form the liquid crystal layer 31, and it is necessary to arrange the sealing material 32 (a first sealing material 32a and a second sealing material 32b) so as to surround the liquid crystal layer formation region 42.

Since it is difficult to directly attach the sealing material 32 to the alignment film 29 with sufficient strength in the conventional method, it is difficult to appropriately form the sealing material 32 at a portion of the alignment film 29 where the electrode portion 25 is not exposed in the vicinity thereof. Thus, it is difficult for the conventional method to appropriately arrange the second sealing material 32b extending so as to cross the alignment film 29 in the example illustrated in FIG. 13. On the other hand, according to the light-modulating cell 10 (particularly, the sealing material 32 and the alignment film 29) of the present embodiment, the sealing material 32 can be directly attached to the alignment film 29 with sufficient strength, and thus, it is possible to appropriately arrange the sealing material 32 even at the position on the alignment film 29 where the electrode portion 25 is not exposed in the vicinity thereof. Therefore, according to the present embodiment, it is possible to appropriately form both the first sealing material 32a and the second sealing material 32b illustrated in FIG. 13 on the alignment film 29. In the example illustrated in FIG. 13, the "first sealing material 32a" is formed at the position on the alignment film 29 where the electrode portion 25 is exposed in the vicinity. Thus, the first sealing material 32a may be arranged only on the alignment film 29 and be attached only to the alignment film 29, or may be arranged both on an electrode portion 25 and on the alignment film 29 and be attached to both the electrode portion 25 and the alignment film 29.

Further, the above-described embodiment is also effective for the combination of "epoxy resin and polyimide" used widely for a combination of a component contained in the sealing material 32 and the alignment film 29, and the applicable range of the above-described embodiment is extremely wide.

Incidentally, the case where the permeation region 40 has the length of 30 nm or more with respect to the stacking direction D has been described in the above embodiment, but the length of the permeation region 40 in the stacking direction D may not necessarily be 30 nm or more. As a result of intensive research, the inventor of the present application has confirmed that the sealing material 32 is relatively strongly attached to the alignment film 29 (for example, a force required for peeling off the alignment film 29 from the sealing material 32 is about 10 N/cm width) when at least a part of the components constituting the sealing material 32 permeate up to the portion separated from the end surface 29a on the sealing material 32 side by 30 nm or more with respect to the stacking direction D in the alignment film 29, and basically, the degree of adhesion between the sealing material 32 and the alignment film 29 increases as the length of the permeation region 40 in the stacking direction D increases. Therefore, the length of the portion where at least a part of the components of the sealing material 32 permeate with respect to the stacking direction D from the end surface 29a of the alignment film 29 on the sealing material 32 side is preferably 30 nm or more, and preferably 50 nm or more in view of the above-described consideration concerning material destruction.

Further, the inventor of the present application has confirmed that the degree of adhesion between the sealing material 32 and the alignment film 29 increases as the proportion of the portion, which the permeation region 40 accounts for, to the entire alignment film 29 increases with respect to the length in the stacking direction D. Specifically, at least a part of the components (for example, the thermosetting resin) of the sealing material 32 preferably permeates a portion occupying 30% or more of the entire alignment film 29, and more preferably permeates a portion occupying 50% or more of the entire alignment film 29 with respect to the length in the stacking direction D.

Incidentally, a method of evaluating the degree of permeation of the constituent component of the sealing material 32 into an alignment film 29 is not particularly limited. For example, it is possible to evaluate the degree of permeation of the constituent component of the sealing material 32 into the alignment film 29 by analyzing a picture such as a SEM image (see FIGS. 4 and 5) by vision or image processing, or by analyzing the actual light-modulating cell 10 (in particular, the alignment film 29 and the sealing material 32) using an arbitrary component analyzer such as a gas chromatography mass spectrometer (GCMS) or an X-ray photoelectron spectroscopy.

The present invention is not limited to the above-described embodiments and modifications, but may include various embodiments to which various modifications that can be conceived by those skilled in the art are added, and the effects exerted by the present invention are not limited to the above-described matters, either. Therefore, various additions, modifications, and partial deletions can be made to each of the elements described in the claims and the specification without departing from a technical idea and a gist of the present invention.

REFERENCE SIGNS LIST 10 light-modulating cell
12 light-modulating controller 14 sensor device
16 user operation unit
21 polarizing element
23 resin film
25 electrode portion
27 electrode base material layer
29 alignment film
29a end surface
31 liquid crystal layer
32 sealing material
32a first sealing material
32b second sealing material
33 spacer
36 hard coat layer
40 permeation region
42 liquid crystal layer formation region

The invention claimed is:

1. A stacked body comprising a first resin film, a first electrode portion, a first alignment film, and a sealing material which are stacked, and further comprising a second alignment film, the sealant material being arranged between the first and second alignment films, wherein:
the first alignment film has a permeation region where at least a part of components constituting the sealing material permeate, and
at least a part of the components constituting the sealing material which permeate the first alignment film permeates up to a portion separated from an end surface of the first alignment film on a side of the sealing material by 30 nanometers or more with respect to a stacking direction of the first alignment film and the sealing material.

2. A stacked body comprising a first resin film, a first electrode portion, a first alignment film, and a sealing material which are stacked, and further comprising a second alignment film, the sealant material being arranged between the first and second alignment films, wherein:
the first alignment film has a permeation region where at least a part of components constituting the sealing material permeate and a non-permeation region where no components constituting the sealing material permeate,
a portion of the sealing material that does not permeate the first alignment film, the permeation region of the first alignment film, and the non-permeation region of the first alignment film are sequentially arranged in a stacking direction, and
at least a part of the components constituting the sealing material which permeate the first alignment film permeates up to a portion separated from an end surface of the first alignment film on a side of the sealing material by 30 nanometers or more with respect to a stacking direction of the first alignment film and the sealing material.

3. The stacked body according to claim 1, wherein the permeation region occupies a range of 30% or more of the first alignment film with respect to a stacking direction of the first alignment film and the sealing material.

4. The stacked body according to claim 1, wherein:
the sealing material contains a thermosetting component, and
the components constituting the sealing material that permeate the first alignment film contain the thermosetting component.

5. The stacked body according to claim 4, wherein the thermosetting component is an epoxy resin.

6. The stacked body according to claim 1, wherein the first alignment film contains an organic compound.

7. The stacked body according to claim 6, wherein the organic compound is polyimide.

8. The stacked body according to claim 1, wherein the sealing material contains a photocurable component.

9. A light-modulating cell comprising:
the stacked body according to claim 1; and
a second alignment film, a second electrode portion, and a second resin film which are stacked on the sealing material of the stacked body.

10. A light-modulating cell comprising:
a pair of polarizing elements;
a pair of electrode base material layers arranged between the pair of polarizing elements, each of the electrode base material layers having a resin film and an electrode portion fixed to the resin film;
a pair of alignment films arranged between the pair of electrode base material layers;
a liquid crystal layer arranged between the pair of alignment films; and
a sealing material arranged between the pair of alignment films to be adjacent to the liquid crystal layer,
wherein at least a part of components constituting the sealing material permeates up to a portion separated from an end surface of at least any one of the pair of alignment films on a side of the sealing material by 30 nanometers or more with respect to a stacking direction of the pair of alignment films and the sealing material.

11. The light-modulating cell according to claim 10, wherein:
the sealing material contains a thermosetting component, and
the components constituting the sealing material that permeate at least one of the pair of alignment films contain the thermosetting component.

12. The light-modulating cell according to claim 11, wherein the thermosetting component is an epoxy resin.

13. The light-modulating cell according to claim 10, wherein the pair of alignment films contains an organic compound.

14. The light-modulating cell according to claim 13, wherein the organic compound is polyimide.

15. The light-modulating cell according to claim 10, wherein the sealing material contains a photocurable component.

16. The stacked body according to claim 2, wherein the permeation region occupies a range of 30% or more of the first alignment film with respect to a stacking direction of the first alignment film and the sealing material.

17. The stacked body according to claim 2, wherein:
the sealing material contains a thermosetting component, and
the components constituting the sealing material that permeate the first alignment film contain the thermosetting component.

18. The stacked body according to claim 17, wherein the thermosetting component is an epoxy resin.

19. The stacked body according to claim 2, wherein the first alignment film contains an organic compound.

20. The stacked body according to claim 19, wherein the organic compound is polyimide.

21. The stacked body according to claim 2, wherein the sealing material contains a photocurable component.

22. A light-modulating cell comprising:
the stacked body according to claim 2; and
a second alignment film, a second electrode portion, and a second resin film which are.

* * * * *